July 7, 1959
D. L. KAYSER
2,893,238
LEAKAGE DETECTOR
Filed Aug. 31, 1956
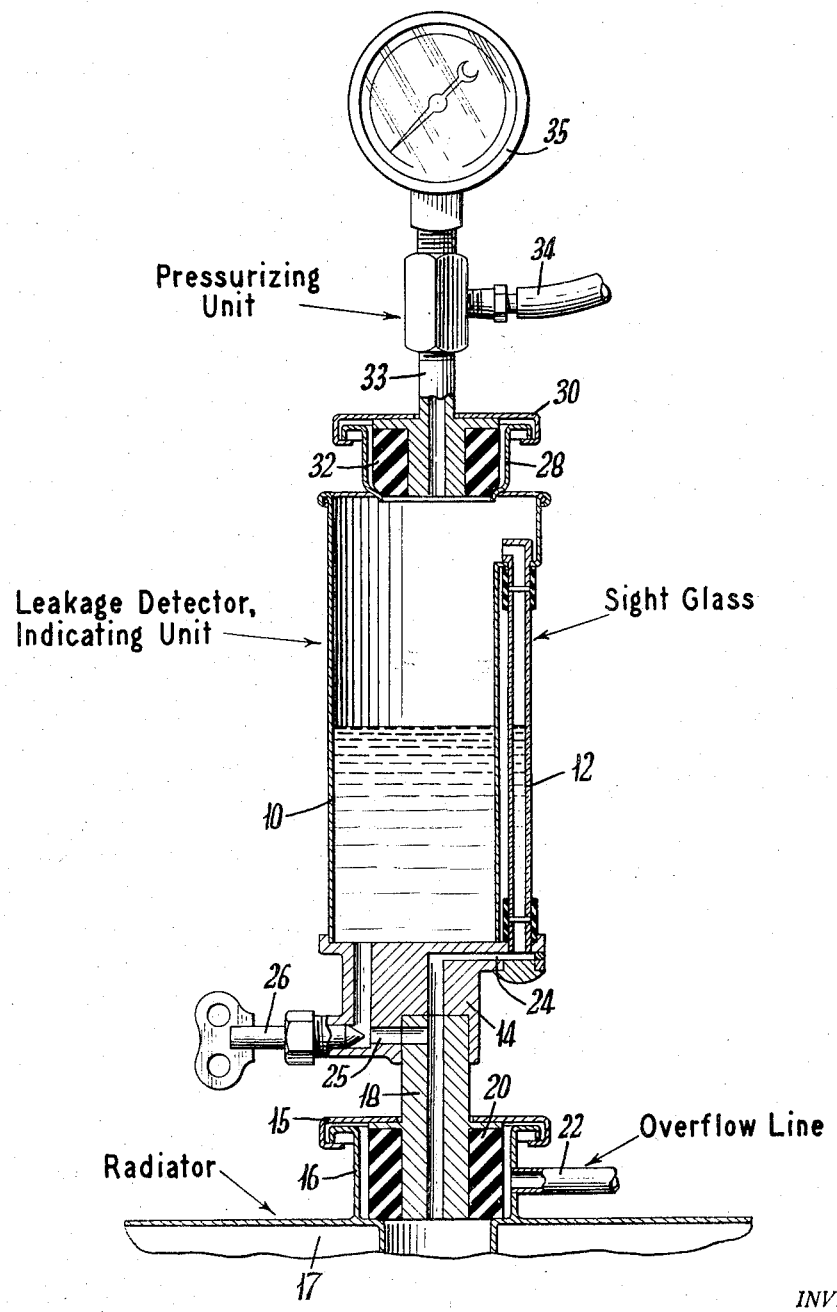
INVENTOR.
DAVID L. KAYSER
BY
*Richard S. Shreve Jr.*
ATTORNEY

United States Patent Office 2,893,238
Patented July 7, 1959

2,893,238

LEAKAGE DETECTOR

David L. Kayser, Kenmore, N.Y., assignor to Union Carbide Corporation, a corporation of New York Application August 31, 1956, Serial No. 607,435

3 Claims. (Cl. 73—40)

This invention relates to leakage detectors, and more particularly to pressurized sight glass devices for detecting small leaks in automotive cooling systems.

Expedients heretofore employed for this purpose have often been difficult in operation and characterized by erroneous or inconclusive results. The relatively large volume of air being compressed in the region of the pressure indicating system, and the lack of the required sensitivity in the small standard Bourdon gauges used for indicating a pressure decrease have contributed to the difficulties.

The main objects of the present invention are therefore to avoid the compression of air and provide an all-liquid system of leak detection, and to provide more sensitive indication of the results.

In the present invention the cooling system is extended to, and terminated in, a small bore tube or sight glass, and the coolant liquid is thus made a part of the leak indicating apparatus. An all-liquid and therefore relatively non-compressible indicating system results, with a considerable gain in sensitivity over existing devices.

In the Hopkins Patent No. 2,171,113, gas leaking from the combustion chamber into the cooling system displaces liquid in a tank, and causes a rise of level in a sight glass, which is in turn dependent on the pressure of such gas. The sight glass and tank are vented to the atmosphere.

Another object of the present invention is to apply pressure from above a closed all-liquid system to force coolant liquid out through the leak. The loss of coolant is indicated by a decrease in level of coolant in the sight glass. A further object is to automatically plug off the radiator overflow line as the detector is applied to a filler opening associated with an overflow line.

In the drawings:

The single figure is a vertical section through a leak detector according to the preferred embodiment of the present invention shown mounted in the filler opening of an automobile radiator.

The leak detector comprises a top tank 10 provided with a sight glass 12 for indicating liquid level. The tank and sight glass are mounted on a base assembly 14, the bottom of which is provided with cap 15 for attachment to the filler opening 16 of an automobile radiator 17.

A pipe 18 passes through the cap 15, and is surrounded by an annulus 20 of compressible material such as rubber, which automatically seals off the radiator overflow line 22 when the cap 15 is applied.

The sight glass 12 is connected to the pipe 18 by a passage 24, and the tank 10 is connected to the pipe 18 by a by-pass 25 containing a valve 26, which when open equalizes the liquid level in the tank and sight glass.

The top of the tank 10 is provided with a filler opening 28, adapted to receive a sealing cap 30 containing a rubber sealing annulus 32. A pipe 33 passes through the cap 30 and is provided with a pressure inlet such as a tire valve 34. The pipe terminates in a pressure gauge 35 to indicate the degree of pressurization of the indicator.

In operation, the radiator and cooling system being initially filled with coolant liquid in the usual manner, the indicator is mounted on the automobile radiator by applying the cap 15 to the filler opening 16. The annulus 20 serves as a stopper, to plug the overflow line 22. The tank 10 is then completely filled with coolant liquid through the filler opening 28 in the top. The pressurizing unit carried by the cap 30 is connected to the filler opening 28 which is sealed by the stopper 32. With the valve 26 open pressure is applied through the inlet 34 and the liquid level is allowed to equalize between the tank 10 and the sight glass 12 at about the midpoint of the sight glass. The valve 26 is then closed to isolate the liquid in the tank 10 from the passage 25 and sight glass 12, thereby restricting the volume of the indicating liquid. A drop in level of coolant liquid in the sight glass 12 denotes a loss of coolant due to leakage.

What is claimed is:

1. Leakage detector comprising a sight glass mounted on a base forming a cap for a filler opening, a passage in said base connecting said sight glass to the filler opening, means for filling said sight glass and passage with coolant liquid, means for isolating said sight glass and passage from said filling means, and means for applying air pressure to the top of the liquid in said sight glass to force coolant liquid out through any leak, the resultant decrease in liquid level in said sight glass indicating the leakage.

2. Leakage detector comprising a tank and a sight glass mounted on a base forming a cap for a filler opening, a passage in said base connecting said sight glass to the filler opening, a by-pass in said base connecting said tank to said passage, a valve in said by-pass, a filler opening in the top of said tank for receiving coolant liquid, a cap for said tank filler opening, and means for supplying air pressure through said tank cap to pressurize the liquid in said tank and sight glass.

3. Leakage detector comprising a tank and a sight glass mounted on a base forming a cap for a radiator filler opening, a stopper in said cap for sealing off the radiator overflow pipe, a passage in said base connecting said sight glass to the filler opening, a by-pass in said base connecting said tank to said passage, a valve in said by-pass, a filler opening in the top of said tank for receiving coolant liquid, a cap for said tank filler opening, and means for supplying air pressure through said tank cap to pressurize the liquid in said sight glass and force coolant liquid out through any leak.

References Cited in the file of this patent

UNITED STATES PATENTS

| | | |
|---|---|---|
| 1,196,828 | Weatherson | Sept. 5, 1916 |
| 2,171,113 | Hopkins | Aug. 29, 1939 |
| 2,520,175 | Socke | Aug. 29, 1950 |
| 2,760,367 | Stromberg | Aug. 28, 1956 |
| 2,784,731 | Bealer | Mar. 12, 1957 |